United States Patent [19]
Elkind et al.

[11] Patent Number: 5,208,666
[45] Date of Patent: May 4, 1993

[54] ERROR DETECTION FOR DIGITAL TELEVISION EQUIPMENT

[75] Inventors: Bob Elkind, Gaston; David Fibush, Beaverton; Kenneth M. Ainsworth, Aloha, all of Oreg.

[73] Assignee: Tektronix, Inc., Wilsonville, Oreg.

[21] Appl. No.: 782,927

[22] Filed: Oct. 25, 1991

[51] Int. Cl.[5] ............................................ H04N 17/00
[52] U.S. Cl. .................................................... 358/139
[58] Field of Search ......................... 358/139, 10, 160; 371/16.1, 15.1, 3, 29.1

[56] References Cited

U.S. PATENT DOCUMENTS

| | | | |
|---|---|---|---|
| 4,821,269 | 4/1989 | Jackson et al. | 358/139 X |
| 4,891,700 | 1/1990 | Meunier | 358/139 |
| 4,924,314 | 5/1990 | Yoshimoto et al. | 358/139 X |
| 5,051,816 | 9/1991 | Harrison et al. | 358/139 X |
| 5,144,430 | 9/1992 | Boelart | 358/139 |

Primary Examiner—Victor R. Kostak
Attorney, Agent, or Firm—Francis I. Gray

[57] ABSTRACT

Error detection for digital television equipment that strips away the vertical and horizontal intervals of a digital video signal so that only the active picture portion of the digital video signal is determined by a digital test signal generated from the digital video signal. The digital test signal has replaced at a predetermined location in the active picture portion of the digital video signal one or more video data words with data values that represent check word data for the active picture portion. The check word data may be inserted into the beginning of one of the horizontal lines of the active picture portion of the next field, or may be modified and inserted into the end of the last line of the active picture portion of the same field of the digital video signal. A receiving instrument processes the output of the digital television instrument under test to generate active picture check word data. The active picture check word data is compared either with the check word data extracted from the predetermined location in the active picture portion of the digital test signal or with a predetermined value to determine whether there were any digital errors in processing of the digital test signal by the digital television equipment.

10 Claims, 4 Drawing Sheets

ERROR DETECTION FOR DIGITAL TELEVISION EQUIPMENT

BACKGROUND OF THE INVENTION

The present invention relates to error detection in digital equipment, and more particularly to error detection for digital television equipment that assures error detection when only the active picture portion of a television signal is transmitted.

Television signals, both audio and video, are now represented and processed digitally. This leads to a different class of signal distortion from the analog world. Analog distortions, such as rolloff, are now yielding to data bit errors in current digital equipment. Whereas rolloff problems usually start off subtly, equivalent to least-significant bit errors in a digital domain, digital errors can affect with equal likelihood most-significant and least-significant bits. Moderate analog domain errors are by their nature relatively innocuous, while moderate digital domain errors, left uncorrected, are not.

Even a robust serial digital interface between equipment can introduce errors. The interface is particularly vulnerable to excessive cable run length due to poor installation, impaired coax cable due to broken shield braids, accidental damage and the like, or aging or failing components in the receiver and transmitter VCO circuits or equalizers, for example. Many of these potential problems show up as intermittent errors, perhaps imperceptible on a studio monitor. These errors visibly or audibly degrade the signal as the fault grows less intermittent.

The Society of Motion Picture and Television Engineers (SMPTE) has proposed a serial digital interface standard that is extremely robust. An automated mechanism whereby single- and multiple-bit errors are detected by studio equipment in service has been proposed as a recommended practice by SMPTE. The detection occurs before the error rate becomes visually or audibly perceptible, and the presence of detected errors is reported to either studio equipment and/or studio operators for corrective action. The error detecting mechanism has a transmitter generating a set of check words, such as parity, checksum and cyclic redundancy check (CRC), that are sent to a receiver. The receiving equipment compares the received check words with its own internally generated set of check words.

Three different error detection mechanisms are proposed, one for each of three classes of transmitted data. Ancillary data, which include audio and teletext data, are checked against the parity bits and checksum words, required by the SMPTE serial standard, that are transmitted with the data. Active video and full field data are checked by sixteen-bit CRC words. CRC words are generated once per video field both in the transmitting equipment and the receiving equipment. At the beginning of the following field the CRC words are transmitted, as ancillary data, and the receiver compares the received CRC words with its self-generated CRC words. A discrepancy denotes a data error.

Active picture checking covers the data samples that represent the active video portion of a video signal. Full field checking covers all data including ancillary data, vertical blanking interval data and horizontal blanking interval data. This is an all-encompassing error check, designed to test all transmitted data. The only data not covered by full field checking are three lines during the vertical interval. At the beginning of these three lines an error data packet is inserted. The second of the three lines is where many switching devices make switches, and the last of these lines is to allow settling time after any switches. As shown in FIG. 1 a full field of video data includes vertical sync and blanking intervals (or a non-video data area for component video), horizontal intervals and an active picture (AP) area. The full field (FF) CRC is generated from the first data word, fff, on the line following the three-line switching interval and ends with the last data word, eef, on the line in the next field preceding the three-line switching interval. The active picture CRC is generated from the first data word, aaa, within the active picture area through the last data word, eea, within the active picture area, excluding all data words in the horizontal intervals. Both CRCs are inserted in the next field within the horizontal interval of the first line of the three-line switching interval as part of the error data packet. The CRCs are sixteen bits of data calculated using the CRC-CCITT polynomial generation method:

$$CRC = X^{16} + X^{12} + X^5 + 1.$$

Generally, the sixteen bits of data are placed in two or more eight-bit order samples.

However certain video equipment strips the vertical sync and blanking intervals and the horizontal intervals from the video data so that only the active picture area is processed. This results in loss of the full field and active picture CRCs that are located within the vertical/horizontal intervals. Thus there is no way to verify data errors for such equipment.

What is desired is error detection for digital television equipment that indicates data errors solely within the active picture area of a video signal where the proposed SMPTE recommended practice is not available.

SUMMARY OF THE INVENTION

Accordingly the present invention provides error detection for digital television equipment by generating a digital television signal in which at least two data words of the active picture area of the digital television signal at a specified location are modified to provide error detection capability at a receiver. There are two modes of operation. In the first mode a check data word, that may be or include a cyclic redundancy check (CRC) data word, is calculated for the active picture area of one field of the digital television signal and placed in the active picture area of the next field at a predetermined location. In the second mode the check data word is calculated for one field of the digital television signal and at least two of the data words of the active picture area of the same field are modified so that the check data word for the entire active picture portion of field is a known constant value. The check data word may have a value that violates television system specification limits, limiting the test of the present invention to out-of-service testing, or the check data word may be located in the active picture area at a location such that the replacement of the check data word by an appropriate algorithm satisfies the television system specifications.

The objects, advantages and other novel features of the present invention are apparent from the following detailed description when read in conjunction with the appended claims and attached drawing.

DESCRIPTION OF THE PREFERRED EMBODIMENT

Figure 1:
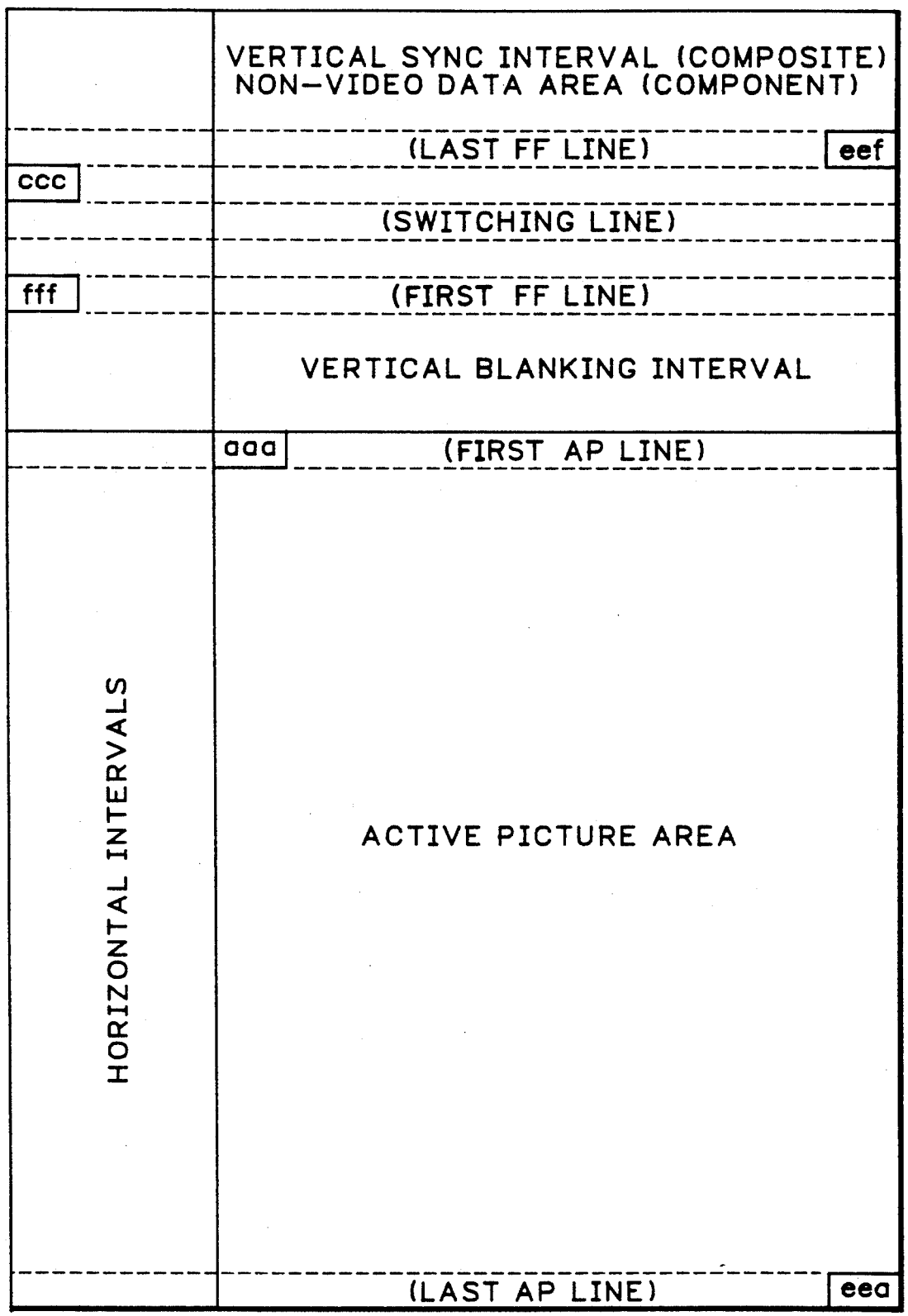
FIG. 1 is an illustration of the location of significant data words within a field of video data according to a proposed SMPTE recommended practice.
Figure 2:
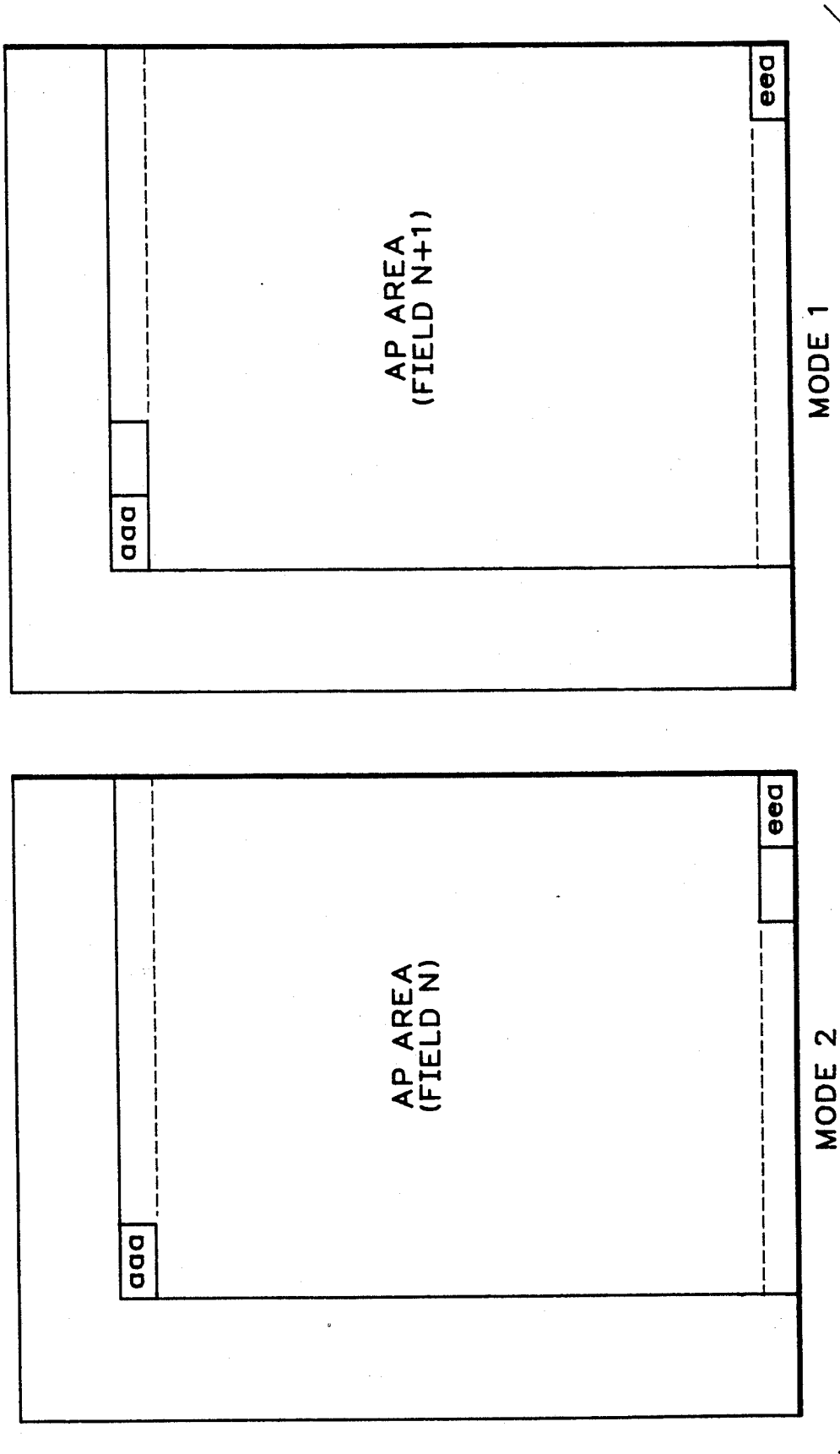
FIG. 2 is an illustration of appropriate locations of significant data words within two consecutive fields of video data according to the present invention.

Referring now to FIG. 2 a check data word is calculated for the active picture (AP) area of field n and, in a first mode, is used to replace at least two data words of the field n+1, i.e., replacing the first two video data samples of the first horizontal line in the AP area. Alternatively in a second mode at least two data words of field n are modified so that the check data word for the entire AP area is a known constant, i.e., the last two video data words may be so modified.

Figure 3:
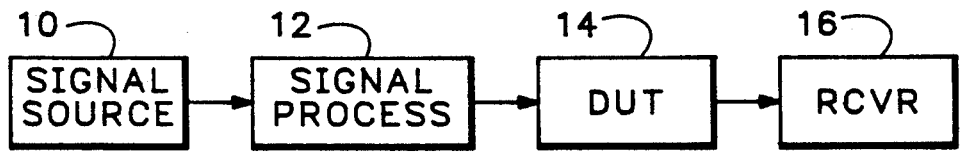
FIG. 3 is a block diagram of a test setup according to the present invention.

As shown in FIG. 3 for testing television equipment a digital video signal source 10 is modified by a signal processor 12 so that it provides a digital video test signal to a device under test (DUT) 14. The output of the DUT 14 is input to a receiver 16 for error detection. The DUT 14 may be a single piece of television equipment, or it may be a plurality of devices forming a video path. Regardless, if any of the devices forming the DUT 14 strip the vertical and horizontal interval information from the digital video test signal so that only the active picture area is processed, the check word data word is still carried with the active picture video data even though the error data packet, placed in the vertical interval according to the proposed SMPTE standard, is lost. Thus the validity of processing of the active picture area of the digital video test signal may still be determined.

Figure 4:
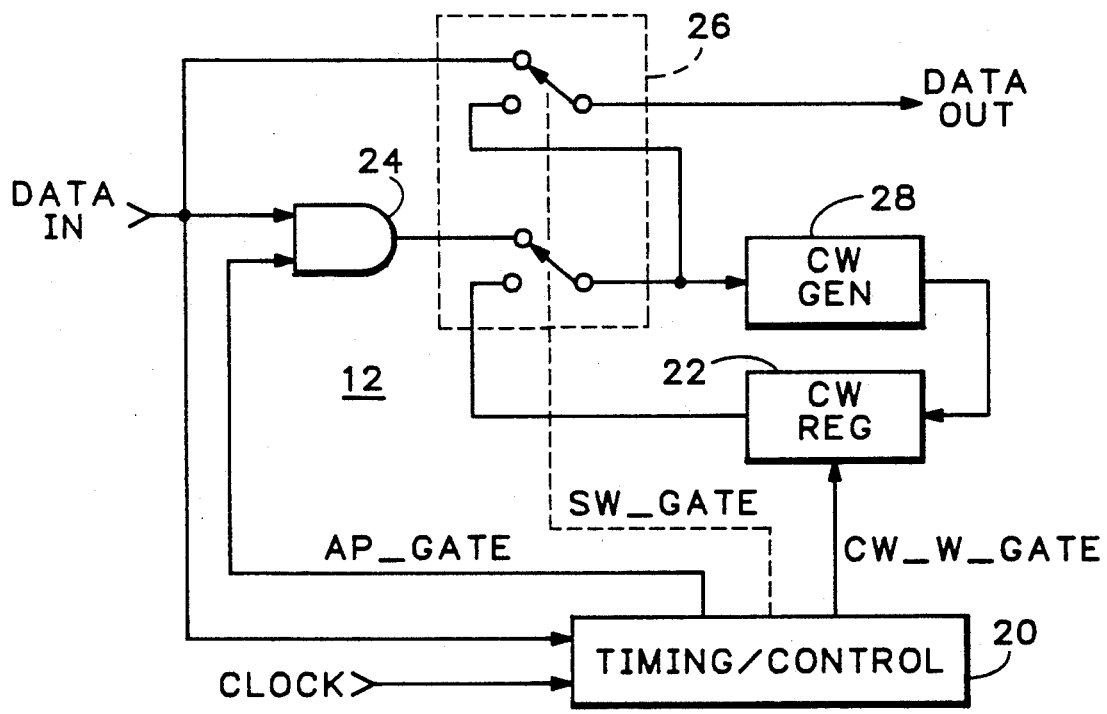
FIG. 4 is a block diagram of a signal source that produces a check word for error detection according to the present invention.

FIG. 4 shows the signal processor 12 in greater detail. A digital video signal (DATA IN) and an associated clock signal (OLOCK) are input to the signal processor 12 to produce the digital video test signal (DATA OUT). The signal processing may be performed in either serial o parallel format and the digital video test signal may be transmitted in parallel format or converted to serial format for delivery to the DUT 14. A timing/control circuit 20 receives the digital video signal and the clock signal and generates three control signals: an active picture gate AP_GATE; a switch gate SW_GATE; and a check word write gate CW_W_GATE. AP_GATE defines which data samples of DATA IN are within the active picture area, SW_GATE defines which samples within the active picture area are to be modified or replaced with a check data word, and CW_W_GATE loads the appropriate check data word into a check word register 22. AP_GATE is input to an AND gate 24 together with DATA IN so that only samples from the active picture area are passed on to one input of a switch 26. DATA IN is also coupled directly to a second input of the switch 26. The switch 26 normally passes the active picture area samples as an input to a check word generator 28. SW_GATE controls the position of the switch 26, and switches the output of the switch to pass the check data word or modified samples from the check word register 22 to the check word generator 28 as well as passing the entire digital video signal, including vertical and horizontal intervals, to output DATA OUT. The output of the check word generator 28 is written into the check word register 22 in response to CW_W_GATE. Switch 26 in response to the SW_GATE switches DATA OUT to the output of the check word register 22 to insert the check word data into the digital video signal to produce the digital test signal as DATA OUT.

In Mode 1 operation CW_W_GATE selects the check word from the check word generator 28 for the complete active picture area samples for transfer to the check word register 22. The check word from the check word register 22 is used to replace the samples of the next field of active picture area samples, such as the first two samples of the first line, as determined by SW_GATE. In Mode 2 operation CW_W_GATE selects the check word from the check word generator 28 just prior to the end of the active picture area for transfer to the check work register 22. This check word is used to replace the last two samples of the current active picture area in response to SW_GATE. By recirculating the check word into the last two samples of the active picture area, the check word for the entire active picture area including the recirculated check word is a predetermined value, namely zero. Generally, the check word data may be modified in the check word register 22 to produce any desired predetermined value.

Figure 5:
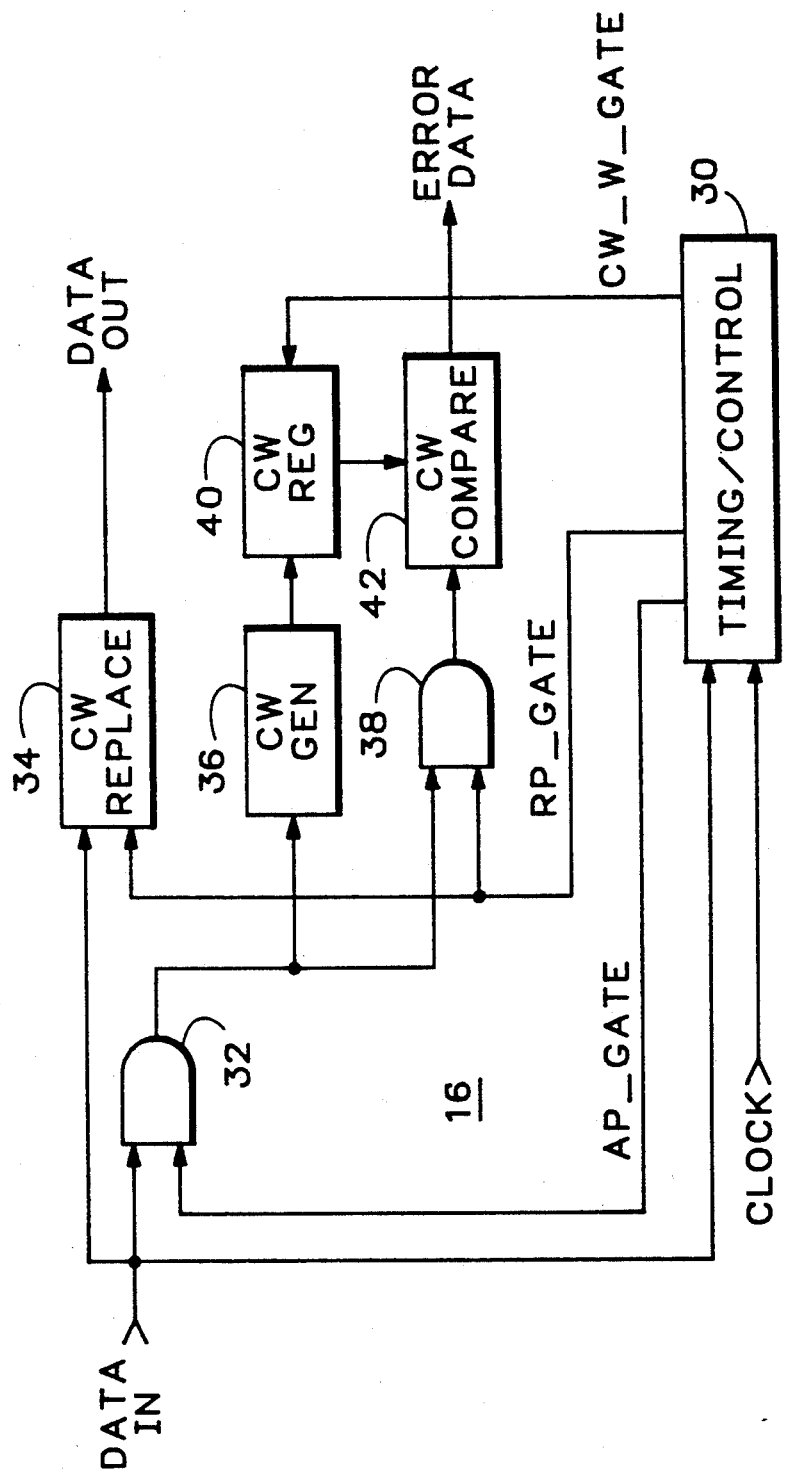
FIG. 5 is a block diagram of a receiver for determining error status from the check word according to the present invention.

Referring now to FIG. 5 the receiver 16 has as inputs the digital test signal output from the DUT 14 and the associated clock signal. The receiver 16 detects errors in the digital test signal from the DUT 14, and may also replace the check words in the digital test signal with valid data values that comply with television standard specifications. Again the receiver 16 may receive the digital test signal in parallel format, or may convert the signal from serial format into parallel format for processing. A timing/control circuit 30 receives the data input and associated clock to develop three control signals similar to those generated by the signal processor 12: an active picture area signal AP_GATE; a sample replace gate RP_GATE; and a check word write gate CW_W_GATE.

AP_GATE and the data input are applied to a first AND gate 32 to pass only active picture area samples for processing. For out-of-service testing DATA IN is DATA OUT, but for in-service testing the digital test signal is input to a check word replacement circuit 34 where an appropriate algorithm is applied to those check word samples occurring during RP_GATE to provide samples having values within television standard specifications. The active picture area samples from AND gate 32 are applied as inputs to a check word generator 36 and to a second AND gate 38 that is enabled by RP_GATE. CW_W_GATE transfers the check word from the check word generator 36 to a check word register 40. The check word in check word register 40 and the check word passed by AND gate 38 are compared in check word comparator 42. If there is a discrepancy between the transmitted check word from the input data and the generated check word, then the check word comparator 42 provides an error detection signal ERROR DATA.

For Mode 1 operation the check word from field n+1 is extracted from the data input by AND gate 38 as determined by RP_GATE. This check word is compared with the check word for field n from the check word generator 40 to determine if there is an error in field n data. In Mode 2 AND gate 38 may be eliminated as the check word from the check word generator 40 is compared with the known constant value, such as zero, in the check word comparator 42 to determine if there is an error in field n data. In either mode the check word replacement circuit 34 extracts the two samples identified by RP_GATE and replaces them with valid video values. For example if the samples to be replaced are the last two samples in an active horizontal line, the penultimate sample may be replaced with a value that is one-third of the way between the previous (valid video) sample and blanking and the last sample may be replaced by a value that is one-half of the way between the new penultimate sample and blanking.

Although the error detection described above is applied on a field by field basis, it may also be performed on a line by line basis. For example, check word data may be generated on a line by line basis for the active picture portion, with the check word data inserted at the end of the same line or at the beginning of the next line of the active picture portion. The receiving instrument correspondingly performs error detection line by line for the active picture portion.

Thus the present invention provides error detection for digital television equipment by inserting into a digital video signal within the active picture area a check word based solely upon the samples within the active picture area of either the current or the prior field, applying the resulting digital video signal into a video path, and determining a check word for the active picture area at the output of the video path that is compared with the inserted check word or a known constant value.

What is claimed is:

1. An error detection system for testing digital television equipment of the type that processes only the active picture area of a television signal comprising:
   means for generating a digital test signal for input to the digital television equipment, the digital test signal having check word data inserted into the active picture area of a digital video signal at a predetermined location; and
   means for receiving from the digital television equipment an output corresponding to the digital test signal, the receiving means including means for generating check word data from the output for the active picture area and for comparing the active picture area check word data with the check word data inserted by the generating means to determine whether an error occurred between the input and the output of the digital television equipment.

2. The error detection system as recited in claim 1 wherein the receiving means further comprises means for modifying the received digital test signal by replacing the inserted check word data with valid television data samples.

3. The error detection system as recited in claim 1 wherein the generating means comprises:
   means for processing the active picture area of the digital video signal to produce the check word data for the entire active picture area for each field of the digital video signal; and
   means for inserting the check word data at the predetermined location of the active picture area of the next field of the digital video signal to produce the digital test signal.

4. The error detection system as recited in claim 1 wherein the generating means comprises:
   means for processing the active picture area of the digital video signal to produce the check word data for the entire active picture area less the last few samples that represent an insertion area for each field for each field of the digital video signal; and
   means for inserting the check word data into the insertion area of the same field of the digital video signal for which the check word data is produced to produce the digital test signal.

5. The error detection system as recited in claim 4 wherein the generating means further comprises means for modifying the check word data to produce modified check word data so that check word data for the entire active picture area of each field equals a predetermined value.

6. The error detection system as recited in claim 1 wherein the receiving means comprises:
   means for processing the received digital test signal to produce received check word data for the active picture area of the digital test signal; and
   means for comparing the received check word data with a predetermined value to determine whether an error occurred between the input and output of the digital television equipment.

7. The error detection system as recited in claim 1 wherein the receiving means comprises:
   means for processing the received digital test signal to produce received check word data for the active picture area of the digital test signal;
   means for extracting the check word data corresponding to the received check word data from the digital test signal; and
   means for comparing the received check word data with the extracted check word data to determine whether an error occurred between the input and output of the digital television equipment.

8. The error detection system as recited in claim 1 wherein the generating means comprises:
   means for processing the active picture area of the digital video signal to produce the check word data for the entire active picture area for each line of the digital video signal; and
   means for inserting the check word data at the predetermined location of the active picture area of the next line of the digital video signal to produce the digital test signal.

9. The error detection system as recited in claim 1 wherein the generating means comprises:
   means for processing the active picture area of the digital video signal to produce the check word data for the entire active picture area less the last few samples that represent an insertion area for each line of the digital video signal; and
   means for inserting the check word data into the insertion area of the same line of the digital video signal for which the check word data is produced to produce the digital test signal.

10. The error detection system as recited in claim 4 wherein the generating means further comprises means for modifying the check word data to produce modified check word data so that check word data for the entire active picture area of each line equals a predetermined value.

* * * * *